Aug. 29, 1933.  R. FITZPATRICK  1,924,353

HANGER FOR PIPES AND THE LIKE

Filed March 25, 1932

Inventor
Ray Fitzpatrick
Dyer & Kirchner
By
Attorneys

Patented Aug. 29, 1933

1,924,353

UNITED STATES PATENT OFFICE 1,924,353

HANGER FOR PIPES AND THE LIKE

Ray Fitzpatrick, East Palestine, Ohio

Application March 25, 1932. Serial No. 601,267

6 Claims. (Cl. 248—31)

This invention relates to hangers and more particularly to that type of hanger or support which is designed to be disposed at intervals along a water or gas pipe or electric conduit for the purpose of suspending the same beneath the floor or from the ceiling of a building or the like.

This application is a continuation in part of my pending application Serial No. 559,113, Hanger for pipes and the like, filed August 24, 1931.

The hanger is particularly adapted for use in suspending the pipes of sprinkler systems and the like which are designed to be supported at a uniform, relatively short distance from a ceiling.

One object of the invention is to provide a hanger which will be rugged and simple in construction and inexpensive to manufacture.

Another object of the invention is to provide a hanger which can be quickly installed by unskilled labor with the use of only the simplest tools.

Another object of the invention is to provide a hanger which will lock the supported pipe or cable permanently in any desired position and which can be easily disassembled.

Another object of the invention is to provide a hanger which will permit considerable adjustment of the supported pipe or cable in a vertical direction in order that when a plurality of hangers are used adjustment and alignment of the supported member will be facilitated.

Further objects include the provision of a hanger of the type indicated including an assembly of support rod, pipe-supporting strap, and a member connecting the rod and the strap, having novel structural features for holding the several elements of the assembly rigidly together in correct alignment, preventing accidental displacement of the supported pipe or its equivalent axially with respect to the rod, preventing lateral displacement or rocking of the pipe-supporting portion of the strap relatively to the connecting member, permitting the use in the strap of material of maximum width and therefore of increased tensile strength, and resulting in a hanger adapted to withstand stresses greatly in excess of the capacity of the best prior art hangers of which I am aware.

Other and further objects and advantages of the invention will become more apparent from the following detailed description and the accompanying drawing, in which, Figure 1 is a side view of the hanger ready to be assembled;

Figure 1:
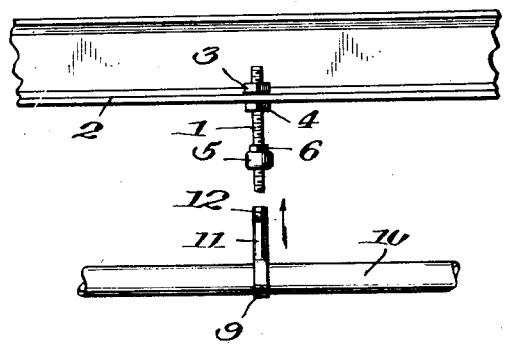
Figure 2:
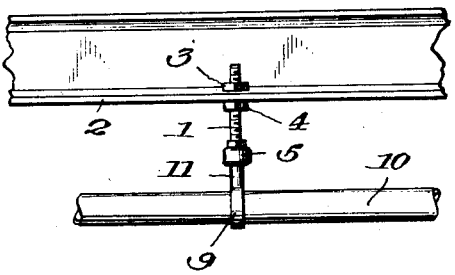
Fig. 2 is a side view of the hanger after the pipe has been secured and locked in position.

With more particular reference to the drawing, the reference character 1 designates a support rod of circular cross section and any desired construction, provided with an upper portion adapted to be secured to the structure from which the support is to be hung. In the particular embodiment shown in the drawing the rod 1 is shown threaded throughout its entire length and secured to the lower flange 2 of an I-beam by means of the nuts 3 and 4. It is obvious that the upper end of the rod 1 may take any of a number of convenient forms, being disposed as a hook, bracket, eye or the like, depending on the nature of the particular structure to which it is designed to be secured.

A nut 5 of special construction is adapted to be engaged in screw-threaded relation with the lower end of the rod 1. This nut is conveniently formed of cast iron, and may have an upper portion 6 provided with an internally threaded bore to engage the support rod 1. A portion of the nut is preferably faceted to be engaged by a wrench.

The nut is internally recessed at 7, below its upper portion 6, to provide an internal chamber of a diameter considerably greater than the diameter of the support rod 1, and this chamber is closed at the lower end of the nut by an end wall 8 provided with a central opening constricted relatively to the chamber 7, but of a diameter greater than that of the threaded bore of the nut and the rod 1. When the nut is threaded upon the rod 1 the recess thus provides an internal annular channel between the wall of the chamber and the exterior of the rod 1.

The design of the nut described above may be somewhat varied without departing from the spirit and principle of the present invention. The structural features of the nut which are essential to the spirit of the invention broadly considered do not require any specific location of its threaded bore and faceted exterior, or any particular design of other features, it being necessary for the purposes of this invention merely to provide the member with a portion adapted to engage the rod and another portion having an internally enlarged channel of a length less than the axial dimension of the member, although the proportions of certain parts of the member with respect to other cooperating parts of the hanger assembly, hereinafter pointed out in detail, are important in achieving various specific objects and advantages of the preferred embodiment of the invention described herein.

A pipe-supporting strap is formed of a strip of metal having a central portion 9 preferably shaped to conform to and embrace the pipe or conduit 10 which is to be supported. The metal should be sufficiently rigid to retain its shape under considerable strain. In the embodiment shown in the drawing the strap has a central portion 9 which is flat on at least its interior side and is adapted to surround the pipe to be supported. Extending from the central portion 9 are legs 11 which as shown in the drawing are preferably of considerable length and lie normally in substantially parallel planes. In most instances it is desirable to have the flat portion 9 almost completely surround the pipe in order that the pipe will be prevented from moving upwardly relatively to the strap. In some instances however, where it is not desired to prevent such movement of the pipe the legs 11 may extend tangentially from the pipe. In either case all or substantially all of the length of each leg 11 is channelled longitudinally or made arcuate in cross section to conform to the curved surface of the rod 1 in order that the rod may be embraced and substantially engaged snugly by the legs through a relatively large area, and in order that the strap may be made of material which is relatively wide and hence relatively strong.

The ends of the strap legs 11 are provided with outwardly extending bosses or outwardly shouldered enlargements 12 of such shape and size as to pass together through the constricted opening in the nut end wall 8 when the legs are moved fully toward each other and subsequently to separate and seat in the recess or chamber 7 leaving between them sufficient space to accommodate the end of rod 1.

Certain features and proportions of the end bosses 12 are important in achieving the full perfection of the preferred embodiment of the invention. Thus, the length of the bosses is preferably made substantially equal to the axial dimension of the chamber 7, i. e., equal to the distance separating the lower end wall 8 and the opposite portion 6 of the nut which, in the embodiment illustrated, contains the threaded bore. Again, the maximum outward flare of the bosses is preferably such that when received and sprung apart inside the chamber 7, the outermost parts of the bosses will substantially engage the wall of the chamber. Furthermore, the shape of the bosses is preferably such that when positioned in the nut as just indicated a point on their inner surface will substantially engage the surface of the threaded rod 1. Simultaneously, points on the bosses near their juncture with the leg portions 11 of the strap will bear against and be supported by the end wall 8 of the nut at the margin of the constricted opening therein. The outer surface of each boss 12 is transversely curved so that the combined circumferential contour of both bosses conforms to that of the opening in end wall 8 when the bosses are compressed together, and to that of the chamber 7 when the bosses are expanded apart. The end edges of the leg bosses are conveniently flared outwardly to a slight extent, as shown at 13, to assist in guiding the end of rod 1 into the space between the bosses. These several features of the preferred nut and leg design cooperate to render the assembly desirably rigid and resistant to relative movement and separation, in certain respects more fully adverted to hereinafter.

Figure 3:
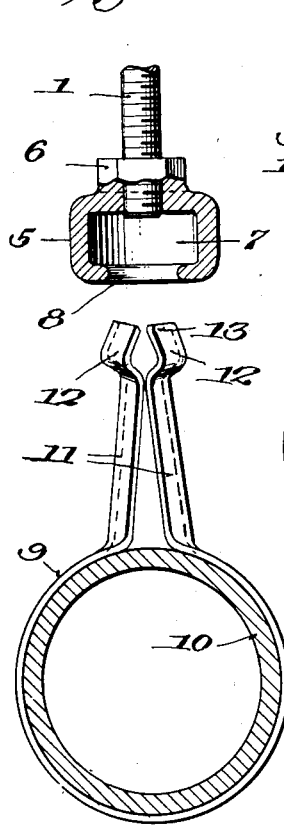
Fig. 3 is a relatively enlarged sectional view of the hanger showing its several parts substantially in the relation shown in Fig. 1.
Figure 4:
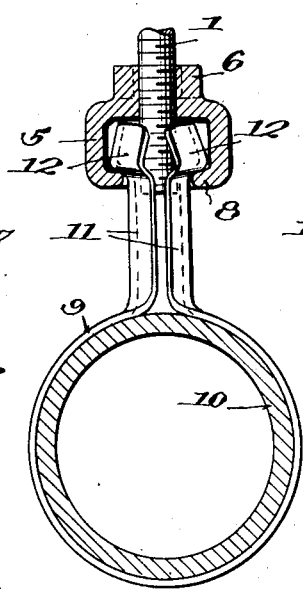
Fig. 4 is a sectional view on the scale of Fig. 3 showing the next step in the assembly of the hanger parts.
Figure 5:
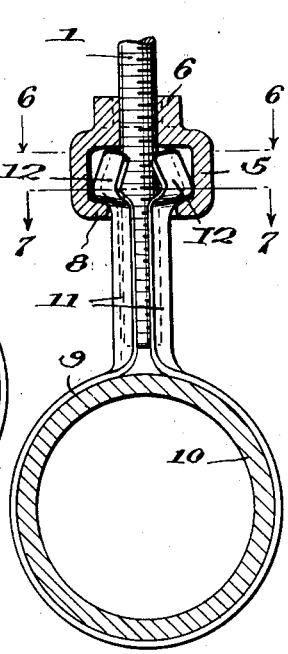
Fig. 5 is also a sectional view on the scale of Fig. 3, showing the hanger parts in completely assembled and adjusted relation, substantially as shown in Fig. 2.
Figure 6:
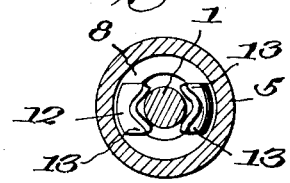
Fig. 6 is a transverse sectional view taken on the line 6—6 of Fig. 5.
Figure 7:
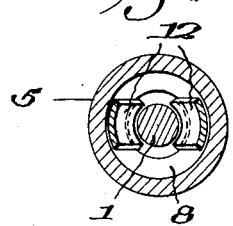
Fig. 7 is a similar view taken on the line 7—7 of Fig. 5.

In assembling the hanger the nut 5 is started on the threads of the rod 1, the curved central portion 9 of the pipe-supporting strap is disposed around the pipe, the legs 11 are moved toward each other and the two end bosses 12 are inserted together into the chamber 7 of nut 5, as shown in Fig. 3. The resilience of the strap member material urges the legs apart, thus seating the bosses 12 in the chamber 7. The nut 5 is then screwed up on the rod 1, the lower end of the rod moving down between the legs of the strap, thus locking the bosses 12 in the chamber 7. Due to the length of the legs 11 of the strap member it is possible to screw the nut 5 a considerable distance up the rod 1 before the lower end of the rod contacts with the supported pipe. Thus it will be seen that after the nut 5 has been advanced sufficiently to lock the pipe-supporting strap in place the vertical position of the pipe may be adjusted within relatively wide limits, as will be evident from the comparison of Figs. 4 and 5. The legs 11 may be of any convenient length depending upon the range of vertical adjustment desired.

It has heretofore been proposed to provide a pipe hanger including a nut provided with a bayonet joint for receiving the bossed ends of the pipe-supporting structure. In assembling such types of hanger it was necessary to move the pipe-supporting strap laterally into engagement with the nut and then drop the strap to seat its bossed ends in the constricted porion of its hollow interior. My present invention however provides a hanger for pipes and the like the parts of which may be assembled by moving the legs of the pipe-supporting strap axially of the nut, thus permitting installation of the hanger at points where lateral adjustment is difficult or impossible, and providing increased range of vertical adjustment of the supported pipe.

It has also been proposed by A. B. Carll in United States Patent No. 702,704, dated June 17, 1902, to provide a hanger including a support rod, a strap, and a nut connecting the strap and rod. This prior hanger, however, lacks the distinct legs 11 as well as type of end bosses and the cooperating structure and proportions of the nut and end bosses included in my present hanger. Because of the novel elements and the novel structure and proportions of the elements of my hanger explained hereinabove and pointed out in the appended claims the present invention provides a hanger having greatly increased rigidity and strength, the parts of which are capable of more accurate alignment and manufacture at less cost in the several respects explained hereinabove and in other respects which will be evident to those skilled in the art.

It is to be understood that I have shown and described the present invention in one form of embodiment only, merely for purposes of exemplification. The invention is capable of embodiment in other and further modified forms, and all such further modifications to the extent that they embody the principles of the invention as pointed out in the appended claims are to be deemed within the scope and purview thereof.

I claim:

1. In a hanger for pipes and the like including a threaded support rod and a nut adapted to engage the support rod having an internal chamber, a pipe-supporting strap provided with end bosses adapted to be moved toward each other and inserted axially into the chamber and to be spread apart and held in engagement with the nut by penetration of the support rod into the space between the end bosses, each of said bosses contacting with the rod in two spaced apart transverse planes when the nut, strap and rod are engaged together.

2. In a hanger for pipes and the like including a threaded support rod and a nut adapted to engage the support rod having an internal chamber, a pipe-supporting strap provided with end bosses adapted to be moved toward each other and inserted axially into the chamber and to be spread apart and held in engagement with the nut by penetration of the support rod into the space between the end bosses, said strap including a central pipe-engaging portion and a leg portion intermediate the central portion and each end boss, the leg portions being normally substantially parallel and transversely curved snugly to embrace and engage the end portion of the support rod and hold the strap against rocking movement relative to the nut.

3. A hanger as claimed in claim 2 in which each of said bosses contacts with the rod in two spaced apart transverse planes when the nut, strap and rod are engaged together.

4. A hanger for pipes and the like including a support rod, a pipe-supporting strap, and a connecting member adapted to engage the rod provided with an end opening and an internal chamber for receiving the ends of the strap, said ends being outwardly and upwardly directed to provide bevelled shoulders to seat in the chamber of the member and to urge, responsive to the weight of a supported pipe, portions of the strap into tight engagement with the rod.

5. A hanger for pipes and the like including a support rod, a pipe-supporting strap, and a connecting member adapted to engage the rod provided with an end opening and an internal chamber for receiving the end portions of the strap, each of said portions being directed outwardly and upwardly to provide a bevelled shoulder to seat in the end opening of the member and being inwardly directed beyond said shoulder to engage the rod, whereby the weight of the supported pipe is adapted to cause the shoulder to bear against the margin of the end opening of the connecting member and urge the inwardly directed end of the strap into tight engagement with the rod.

6. A hanger for pipes and the like including a support rod, a connecting member adapted to engage the rod provided with an end opening and an internal chamber, a pipe-supporting strap having opposite legs the ends of which are received within the chamber of the member, the extreme end edge of each leg and the portion of the leg end adapted to be disposed immediately in the end opening of the connecting member being substantially vertically aligned, both portions of each leg end being adapted to embrace an opposite side of the rod, and the part of each leg end intermediate said portions being shouldered outwardly and upwardly to coact with the portion of the connecting member defining the end opening to urge, responsive to the load of the supported pipe, the rod engaging portions of the leg ends into tight engagement with the rod.

RAY FITZPATRICK.